United States Patent [19]

Oka

[11] Patent Number: 5,212,809
[45] Date of Patent: May 18, 1993

[54] RADIO COMMUNICATION SYSTEM
[75] Inventor: Tomohiko Oka, Tokyo, Japan
[73] Assignee: Seiko Instruments Inc., Japan
[21] Appl. No.: 399,911
[22] Filed: Aug. 29, 1989
[30] Foreign Application Priority Data Sep. 6, 1988 [JP] Japan .................................. 63-223153

[51] Int. Cl.$^5$ .............................................. H04B 1/38
[52] U.S. Cl. .................................... 455/54.1; 455/88; 455/89
[58] Field of Search .................... 455/88, 89, 34, 54, 455/57, 186; 379/62, 63

[56] References Cited

U.S. PATENT DOCUMENTS

| | | | |
|---|---|---|---|
| 4,593,155 | 6/1986 | Hawkins | 455/88 |
| 4,696,054 | 9/1987 | Tsugei et al. | 455/89 |
| 4,718,110 | 1/1988 | Schaefer | 455/89 |
| 4,748,685 | 5/1988 | Rozanski, Jr. | 379/63 |
| 4,802,201 | 1/1989 | Yoshizawa et al. | 379/63 |
| 4,811,420 | 3/1989 | Avis et al. | 379/63 |

FOREIGN PATENT DOCUMENTS 0198423 8/1988 Japan ..................................... 379/63

Primary Examiner—Reinhard J. Eisenzopf
Assistant Examiner—Andrew Faile
Attorney, Agent, or Firm—Bruce L. Adams; Van C. Wilks

[57] ABSTRACT

A radio communication system comprises plural hand held terminals and a base station communicating with each of the hand held terminals by a two-way radio data transmission. The hand held terminal is set with a system ID number by a proper signal representing the system ID number sent from the base station through a radio data transmission.

20 Claims, 4 Drawing Sheets ness of the invention.

RADIO COMMUNICATION SYSTEM

BACKGROUND OF THE INVENTION

1. Field of the Invention

The present invention relates to a method of setting ID number within a radio communication system used for data transmission within a station yard or the like.

2. Description of the Prior Art

When two or more radio communication systems each comprising a base station and plural hand held terminals, which is used within a station yard or the like, exist closely to each other, they may interfere with each other. In such a case, an ID number identified only within the same system and common to all base stations and hand held terminals within the same system (hereinafter referred to as "system ID number") is set. When a system ID number other than the proper system ID number is received, such radio wave is determined as coming from another system, whereby an interference is prevented. Conventionally, the aforementioned system ID number has a fixed value set beforehand on both base station and hand held terminal by hardware such as bit switch, small capacity ROM or the like.

However, such prior art construction requires special hardware for setting the system ID number, which inevitably prevents the miniaturization of a hand held terminal particularly for portable use. Since the system ID number is fixed by hardware, when the hand held terminal is used on another system (having a different system ID number), the system ID number setting hardware must be changed or replaced, which is uneconomical and ineffective.

SUMMARY OF THE INVENTION

An object of the present invention is to provide a radio communication system which comprises hand held terminals and a base station communicating with each of the hand held terminals by a two-way radio data transmission.

Another object of the present invention is to provide a radio communication system in which a system ID number sent from the base station is easily set in the hand held terminals.

A further object of the present invention is to provide a radio communication system which realizes a miniature and portable hand held terminal.

The above and other related objects and features of the invention will be apparent from the following description of the disclosure in conjunction with the accompanying drawings and the novelty thereof is pointed out in the appended claims.

DESCRIPTION OF THE PREFERRED EMBODIMENT

The invention will now be described with reference to the accompanying drawings representing an embodiment thereof.

Figure 1:
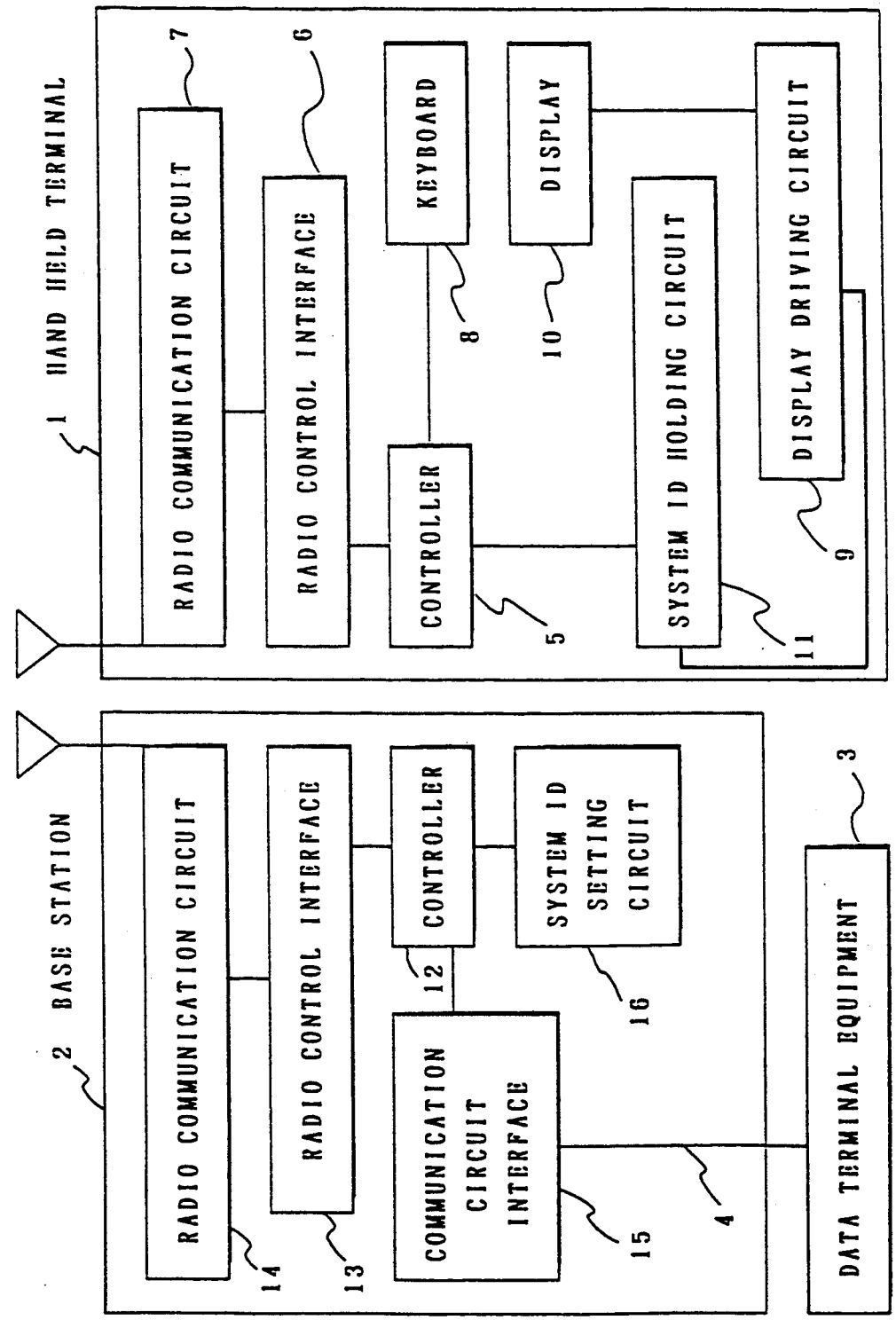
FIG. 1 is a schematic block diagram representing an embodiment of the present invention.

FIG. 1 is a schematic block diagram representing a radio communication system given in on embodiment of the present invention. A hand held terminal 1 is provided with a radio communication circuit 7 and an antenna having a two-way radio data transmission with a base station 2 provided also with a radio communication circuit 14 and an antenna. Then, the base station 2 has communication means with data terminal equipment 3 through a communication line 4.

The hand held terminal 1 comprises a controller 5 consisting of CPU, ROM, RAM, controlling I/0, timer and others, a radio communication circuit 7 controlled by the controller 5 through a radio control interface 6, a keyboard 8 for inputting data, a display 10 for displaying information on the data inputted from the keyboard 8, information sent from the base station 2 through a radio data transmission and others, a display driving circuit 9 for driving the display 10, a system ID holding circuit 11 for holding a system ID number transmitted from the base station and others. The system ID holding circuit 11 uses one part of RAM of the controller 5.

In addition to a controller 12, a radio control interface 13 and a radio communication circuit 14 similar in construction to those of the hand held terminal 1, the base station 2 comprises a communication circuit interface 15 controlled by the controller 12 for communication with the data terminal equipment 3 through the communication line 4, a system ID setting circuit 16 consisting of a small capacity ROM in which the system ID number is set and an interface for reading out the system ID number by the controller 12 and others. The system ID number setting means in the system ID setting circuit 16 may be a bit switch or the like besides the small capacity ROM.

Figure 2:
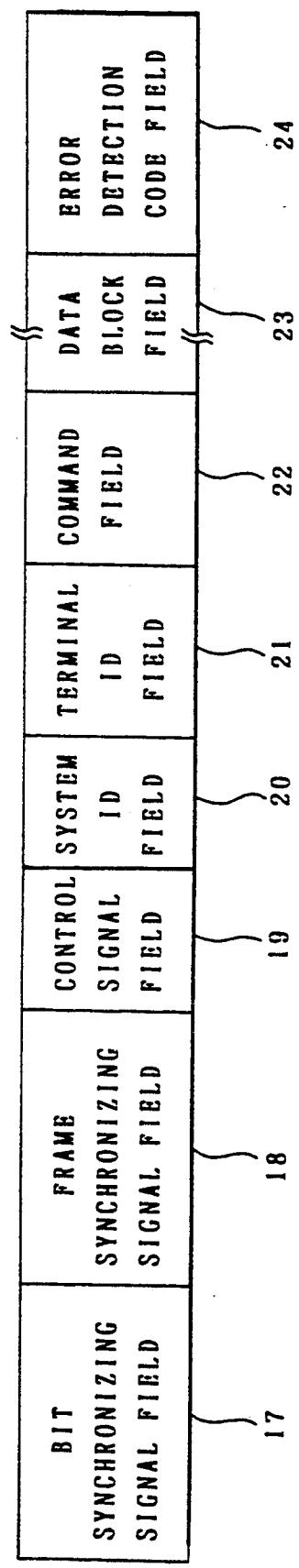
FIG. 2 is a transmitting data format.

FIG. 2 represents a construction of transmitting data in a radio data transmission between the hand held terminal and the base station in this embodiment. The data comprises a bit synchronizing signal field 17 setting a bit synchronizing signal for reproducing a clock of the signal received on a reception side, a frame synchronizing signal field 18 setting a frame synchronizing signal for indicating a start point of the transmitting data, a control signal field 19 setting a control signal including information such as length of the transmitting data, direction and the like, a system ID field 20 setting a system ID number for identifying the base station and the hand held terminal comprising the system, a hand held terminal ID field 21 setting a hand 1 held terminal ID number for identifying each individual hand held terminal when a plurality of hand held terminals are present, a command field 22 defined by a radio transmission protocol of the hand held terminal and base station, a data block field 23 when data to transmit is present, and an error detection code field 24 setting a CRC code generated to each of the fields 19 to 23 which is added finally as an error detection code. The system ID number is set in the system ID field 20 when radio data is transmitted between a hand held terminal and a base station according to the radio transmission protocol, however, a code indicating a system ID number request is set therein when the hand held terminal transmits a transmission request of the system ID number set at the base station, or the base station transmits the system ID number to the hand held terminal upon request. Accordingly, a value the same as the code indicating the system ID number request cannot be set as a system ID number of the base station.

Figure 3:
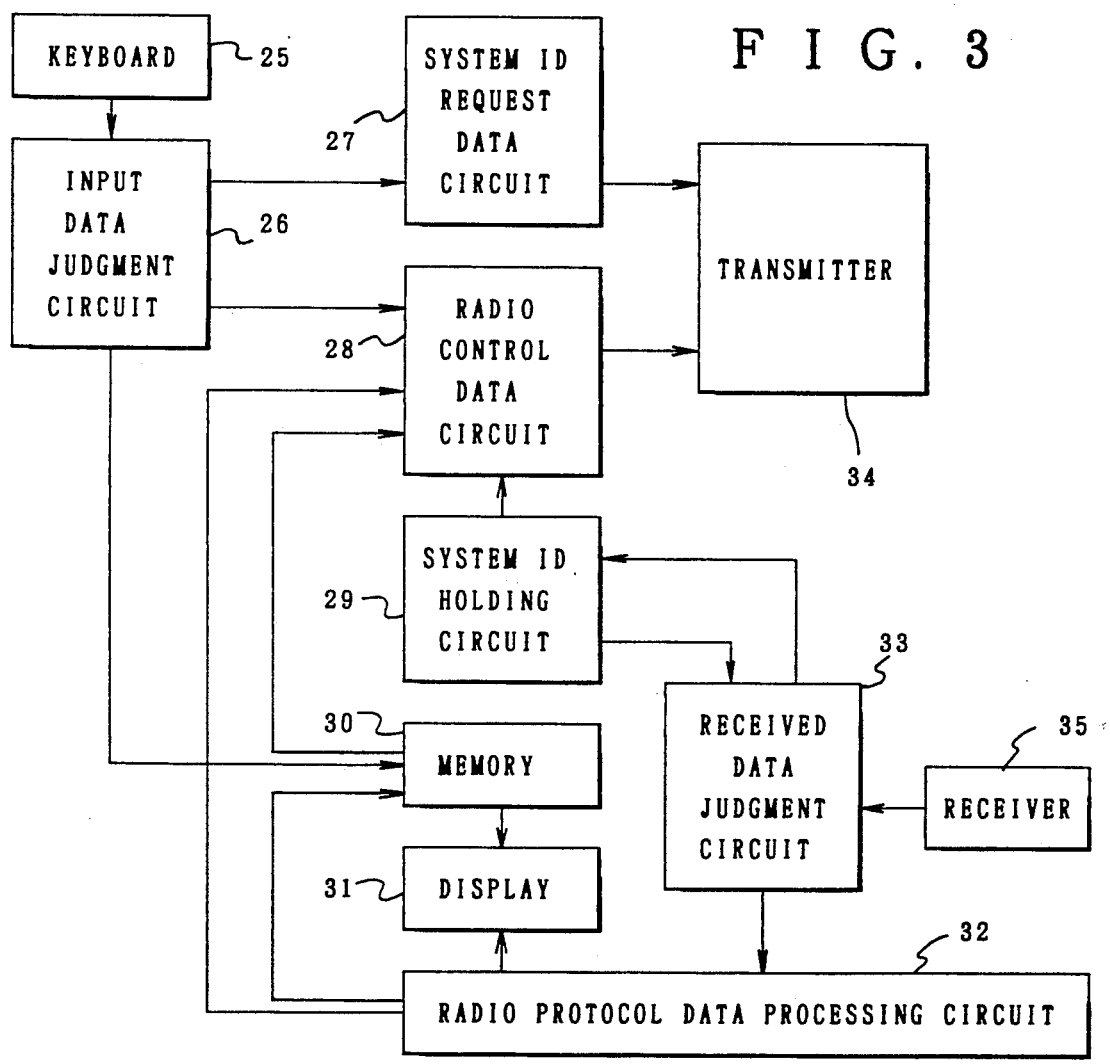
FIG. 3 is a functional block diagram of a hand held terminal.

FIG. 3 is a functional block diagram of each process the controller 5 of the hand held terminal 1 will execute, and an operation of the hand held terminal when receiving the system ID number set at the base station will be described thereby. Input data inputted through a keyboard 25 is checked by an input data judgment circuit 26. As a result where the input data is that for data inputting, it is stored in a memory 30 and displayed, if necessary, on a display 31. In case the input data is that for a transmission request, transmitting data for data transmission is constructed in a radio protocol data circuit 28, and in this case the system ID number held in a system ID holding circuit 29 is set in the system ID field 20 of those fields of the transmitting data of FIG. 2, a unique terminal ID number stored in the memory 30 is set in the terminal ID field 21, a command corresponding to the radio protocol is set in the command field 22, and, where necessary, data stored in the memory 30 is set in the data block field 23. Further, if the input data is that for a system ID number request, then transmitting data for the system ID number request to the base station is constructed in a system ID request data circuit 27, and in this case, a system ID number request code is set in the system ID field 20 of those fields of the transmitting data of FIG. 2.

The transmitting data set in the system ID request data circuit 27 and the radio protocol data circuit 28 is transmitted to the base station 1 through a transmitter 34.

On the other hand, when the transmitting data from the base station 1 is received by a receiver 35, the received data is judged by a received data judgment circuit 33. Where the system ID number set in the system ID field 20 is same as the value held in the system ID holding circuit 29, the received data is analyzed by a radio protocol data processing circuit 32, and displayed on the display 31, stored in the memory 30, as occasion demands, further if it must be transmitted for the radio protocol, then the data is processed at the radio protocol data circuit 28 and the transmitter 34. Then, in case the system ID field 20 of the received data is a system ID number request code, and the hand held terminal transmitted the system ID number request at the time of previous transmission, it is decided that the system ID number has been transmitted from the base station. Then, where the terminal ID field 21 of the received data is the same as the value held in the memory 30, the system ID number value loaded in the data block field 23 is set in the system ID holding circuit 29. Thus, the hand held terminal is ready for data transmission according to the radio protocol thereafter with the base station having the system ID number.

Figure 4:
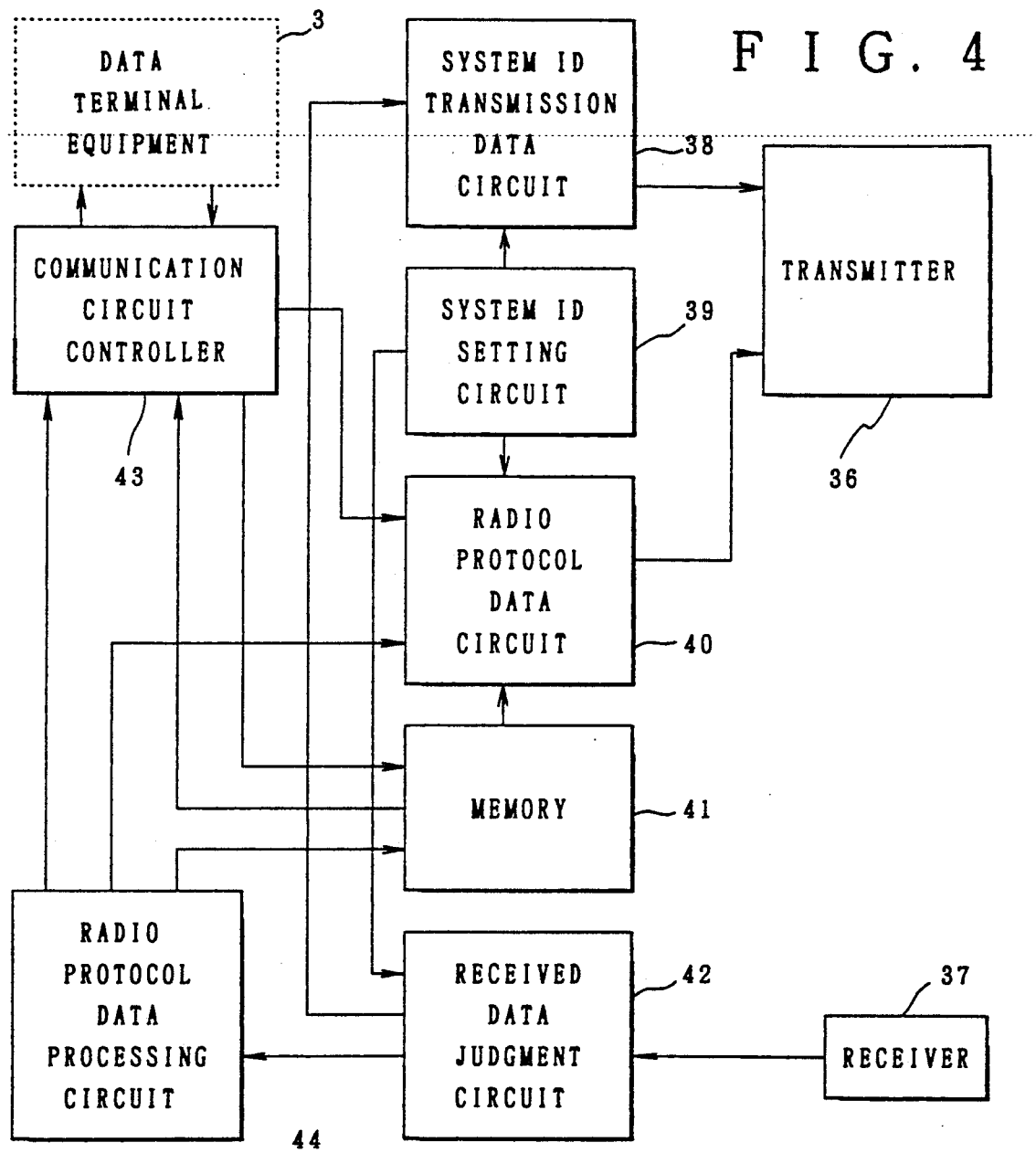
FIG. 4 is a functional block diagram of a base station.

FIG. 4 is a functional block diagram of each process to be executed by the controller 12 of the base station 2, and an operation when the system ID number is transmitted to the hand held terminal will be described thereby. The base station has a communication with the data terminal equipment 3 through a communication circuit controller 43, data received from the data terminal equipment 3 is stored in a memory 41, and when data in the memory 41 is sent to the data terminal equipment 3 on the contrary, it communicates with the data terminal equipment through the communication circuit controller 43. Then, when the data received from the data terminal equipment 3 must be sent to the hand held terminal 1, the communication circuit controller 43 orders a radio protocol data circuit 40 to send the data. Upon receipt of the order, the radio protocol data circuit 40 sets the system ID number set in a system ID setting circuit 39 in the system ID field 20 of that field of the transmitting data of FIG. 2, sets a command according to the radio protocol in the command field 22, and where necessary, sets data stored in the memory 41 in the data block field 23. The transmitting data is sent to the hand held terminal from a transmitter 36.

On the other hand, when the transmitting data from the hand held terminal is received by a receiver 37, the received data is checked by a received data judgment circuit 42. Where the system ID field 20 is the same as the value set in the system ID setting circuit 39, the received data is analyzed by a radio protocol data processing circuit 44, and when the data must be sent again to the radio protocol, a command is issued to the radio protocol data circuit 40, but when it must be transmitted to the data terminal equipment 3, the data is sent to the memory 41, nd a command is issued to the communication circuit controller 43. Then, where a system ID number request code is loaded in the system ID field 20 of the received data, it is decided that the hand held terminal requests a transmission of the system ID number, a command is issued to a system ID transmission data circuit 38, a system ID number request code is set in the system ID field 20, and the system ID number set in the system ID setting circuit 39 is set in the data block field 23. It is then sent to the hand held terminal from the transmitter 36.

In the radio communication system according to the present invention the hand held terminal can easily set a proper system ID number therein according to the following three steps:

Firstly, the hand held terminal transmits data including a system ID number request code to the base station.

Secondly, the base station judges whether the received data includes the system ID number request code, generates data including a system ID number and transmits the data to the hand held terminal.

Thirdly, the hand held terminal judges whether the received data includes the system ID number, and when the system ID number exists, the hand held terminal sets the system ID number therein.

As described above, according to the present invention, since system ID number setting hardware is not required for the hand held terminal, the miniaturization of the hand held terminal can be attained, and a portability of the hand held terminal can particularly be enhanced. Further, when the hand held terminal is to be used in the system having a base station with a different system ID number set thereon, it can be connected simply by modifying a system ID number of the hand held terminal easily, thus realizing a flexible operation of the system.

What is claimed is:

1. A method of setting a system ID number to a hand held terminal, in which a base station communicates with plural hand held terminals by a two-way radio transmission in accordance with the system ID number, the method comprising the steps of:
  A. transmitting first data including a system ID request code to said base station from said hand held terminal by radio transmission, said transmitting step comprising
    A1. inputting a code requesting the system ID number,
    A2. judging said code which requests said system ID number,
    A3. generating said first data including said system ID request code and a terminal ID of said hand held terminal, and A4. transmitting said first data to said base station;

B. transmitting second data including the system ID number to said hand held terminal from said base station by radio transmission; and C. setting said system ID number to said hand held terminal.

2. The method of setting the system ID number claimed in claim 1; wherein step (B) further comprises B1. judging said first data including said system ID request code, B2. generating said second data including said system ID number held by said base station, and B3. transmitting said second data including said system ID number.

3. The method of setting the system ID number claimed in claim 1; wherein step (C) further comprises C1. judging said second data including said system ID number, and C2. setting said system ID number in said second data to said hand held terminal.

4. A method of enabling a hand-held terminal to communicate with a communication system comprised of a base station and plural hand-held terminals communicated by a two-way radio transmission in accordance with a system ID number, the method comprising the steps of:

A. transmitting first data including a system ID request code to said base station from said hand-held terminal by radio transmission, the step (A) further comprising, A1. inputting a code requesting said system ID number, A2. judging said code which requests said system ID number, A3. generating said first data including said system ID request code and a terminal ID of said hand-held terminal, and A4. transmitting said first data to said base station by radio transmission;

B. transmitting second data including said system ID number and said terminal ID to said hand-held terminal from said base station by radio transmission, the step (B) further comprising, B1. judging said first data including said system ID request code and said terminal ID, B2. generating said second data including said system ID number and said terminal ID, and B3. transmitting said second data to said hand-held terminal by radio transmission; and C. setting said system ID number to said hand-held terminal, the step (C) comprising, C1. judging whether said second data has said hand-held terminal's terminal ID, and C2. setting said system ID number included in said second data to said hand-held terminal.

5. A method of communicating a system identification number in a radio communication system from a base station having a given system identification number stored therein to a hand-held terminal having means for storing a system identification number therein, comprising the steps of: requesting the given system identification number for one hand-held terminal by producing a first data word at said one hand held terminal including a first field comprising a system identification request code and a second field comprising a terminal identification for said one hand-held terminal and transmitting the first data word to the base station by radio transmission; receiving said first data word at the base station by producing a second data word including a third field comprising said terminal identification for said one hand-held terminal and a fourth field comprising said given system identification number and transmitting the second data word to said one hand-held terminal by radio transmission; receiving said second data word at said one hand-held terminal; and storing said given system identification number in the means for storing same in said hand-held terminal, whereby the one hand-held terminal is enabled to communicate with the radio communication system.

6. The method according to claim 5, wherein the storing means comprises a random access memory, and the step of storing comprises writing the given system identification number in the random access memory.

7. The method according to claim 5, further comprising setting the given system identification number in the base station in a read-only memory.

8. The method according to claim 5, further comprising setting the given system identification number in the base station in a bit switch.

9. In a method of communicating in a radio communication system with a base station having a given system identification number and at least one hand-held terminal having the given system identification number stored therein, wherein the base station transmits data words having a first field comprising the given system identification number and receives data words having the first field comprising the given system identification number, and wherein at least one hand-held terminal receives data words having the first field comprising the given system identification number and transmits data words having the first field comprising the given system identification number, the improvement comprising: requesting the given system identification number for one hand-held terminal to be enabled to communicate with the system by producing a first data word at said one hand-held terminal including the first field comprising a system identification request code and a second field comprising a terminal identification for said one hand-held terminal and transmitting the first data word by radio transmission to the base station; receiving said first data word at the base station; responding to the first data word at the base station by producing a second data word including the second field comprising said terminal identification for said one hand-held terminal and a data field comprising said given system identification number and transmitting the second data word to said one hand-held terminal by radio transmission; receiving said second data word sat said one hand-held terminal; and storing said given system identification number in said one hand-held terminal, whereby said one hand-held terminal is enabled to communicate with the radio communication system.

10. The method according to claim 9, wherein the storing means comprises a random access memory, and the step of storing comprises writing the given system identification number in the random access memory.

11. The method according to claim 9, further comprising setting the given system identification number in the base station in a read-only memory.

12. The method according to claim 9, further comprising setting the given system identification number in the base station in a bit switch.

13. A radio communication system comprising: a base station having means for storing a given system identification number; at least one hand-held terminal having means for storing a system identification number therein; and means for communicating the given system identification number from the base station to the at least one hand-held terminal, comprising means disposed in said at least one hand-held terminal for producing a first data word including a first field comprising a system identification request code and a second field comprising a terminal identification for said at least one hand-held terminal and for radio transmitting the first data word to the base station, means disposed in the base station for receiving said first data word and responsive to the first data word for producing a second data word including a third field comprising said terminal identification for said at least one hand-held terminal and a fourth field comprising said given system identification number and for radio transmitting the second data word to said one hand-held terminal, and means for receiving said second data word at said one hand-held terminal and for effecting storage of said given system identification number in said storing means of said at least one hand-held terminal.

14. The system according to claim 13, wherein the storing means in each hand-held terminal comprises a random access memory, and the means for effecting storage comprises means for writing the given system identification number in the random access memory.

15. The system according to claim 13, wherein the means for storing the given system identification number in the base station comprises a read-only memory.

16. The system according to claim 13, wherein the means for storing the given system identification number in the base station comprises a bit switch.

17. In a radio communication system with a base station having a given system identification number and at least one hand-held terminal having means for storing a system identification number therein, wherein the base station has means for transmitting data words having a first field comprising the given system identification number and has means for receiving data words having the first field comprising the given system identification number, and wherein each hand-held terminal has means for receiving data words having the first field comprising a system identification number corresponding to that stored in the means for storing and means for transmitting data words having the first field comprising a system identification number corresponding to that stored in the means for storing, the improvement comprising: means disposed in each hand-held terminal for requesting the given system identification number from the base station to enable the hand-held terminal to communicate with the system comprising means for producing a first data word for transmission by the transmitting means at said hand-held terminal including the first field comprising a system identification request code and a second field comprising a terminal identification for said hand-held terminal, and means for radio transmitting the first data word to the base station; means responsive to the first data word received at the base station by the receiving means therein for producing a second data word including the second field comprising said terminal identification for said hand-held terminal and a data field comprising said given system identification number; means for radio transmitting the second data word to said hand-held terminal; and means responsive to the second data word by the receiving means in said hand-held terminal for effecting storage of said given system identification number in said means for storing in said hand-held terminal, whereby said hand-held terminal is enabled to communicate with the radio communication system.

18. The system according to claim 17, wherein the storing means in each hand-held terminal comprises a random access memory, and the means for effecting storage comprises means for writing the given system identification number in the random access memory.

19. The system according to claim 17, wherein the means for storing the given system identification number in the base station comprises a read only memory.

20. The system according to claim 17, wherein the means for storing the given system identification number in the base station comprises a bit switch.

* * * * *